US010386238B2

(12) United States Patent
Lin et al.

(10) Patent No.: US 10,386,238 B2
(45) Date of Patent: Aug. 20, 2019

(54) MOTION DETECTION METHOD AND MOTION DETECTION DEVICE

(71) Applicant: Lite-On Technology Corporation, Taipei (TW)

(72) Inventors: Su-Chen Lin, Taipei (TW); Shr-Rung Lin, Taipei (TW); Chun-Yen Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 32 days.

(21) Appl. No.: 15/836,915

(22) Filed: Dec. 11, 2017

(65) Prior Publication Data

US 2019/0086266 A1    Mar. 21, 2019

(30) Foreign Application Priority Data

Sep. 21, 2017   (TW) ............... 106132360 A (51) Int. Cl.
| | |
|---|---|
| G01J 5/00 | (2006.01) |
| G01J 5/10 | (2006.01) |
| G01J 5/02 | (2006.01) |
| G08B 13/19 | (2006.01) |
| G01J 5/08 | (2006.01) |

(52) U.S. Cl.
CPC ............. G01J 5/0025 (2013.01); G01J 5/026 (2013.01); G01J 5/089 (2013.01); G01J 5/10 (2013.01); G08B 13/19 (2013.01); *G01J 2005/0048* (2013.01)

(58) Field of Classification Search
CPC ..... G01J 5/0025; G01J 5/10; G01J 2005/0048
See application file for complete search history.

(56) References Cited

U.S. PATENT DOCUMENTS

| | | | |
|---|---|---|---|
| 6,288,395 B1 | 9/2001 | Kuhnly | |
| 9,871,959 B1* | 1/2018 | Hlatky | ............... H04N 5/23206 |
| 2005/0128067 A1* | 6/2005 | Zakrewski | ............. G08B 29/20 |
| | | | 340/511 |
| 2009/0123029 A1 | 5/2009 | Harada et al. | |
| 2010/0201527 A1 | 8/2010 | Jensen et al. | |
| 2015/0077566 A1* | 3/2015 | Xiao | .................... H04N 17/002 |
| | | | 348/152 |

(Continued)

FOREIGN PATENT DOCUMENTS

| | | |
|---|---|---|
| CN | 105101506 | 11/2015 |
| TW | 200925706 | 6/2009 |
| TW | 201421182 | 6/2014 |

OTHER PUBLICATIONS

"Office Action of Taiwan Counterpart Application," dated May 11, 2018, pp. 1-6.

*Primary Examiner* — Christine S. Kim
(74) *Attorney, Agent, or Firm* — JCIPRNET (57) ABSTRACT

A motion detection method is provided. The provided method includes the following steps: setting an expected detection range; obtaining a plurality of testing detection signals according to the expected detection range, where the obtained testing detection signals correspond to a plurality of expected detection results; and generating a determination parameter set according to the testing detection signals and the corresponding expected detection results. In addition, a motion detection device using the motion detection method is also provided.

8 Claims, 5 Drawing Sheets

(56) References Cited

U.S. PATENT DOCUMENTS

| | | | |
|---|---|---|---|
| 2016/0161339 A1* | 6/2016 | Tan | G01J 5/0025 702/150 |
| 2016/0174339 A1* | 6/2016 | Rajagopalan | H05B 37/0218 315/152 |
| 2016/0300479 A1* | 10/2016 | Modi | G08B 29/183 |
| 2017/0193782 A1* | 7/2017 | Purohit | G08B 13/2494 |

* cited by examiner

MOTION DETECTION METHOD AND MOTION DETECTION DEVICE

CROSS REFERENCE TO RELATED APPLICATION

This application claims the priority benefit of Taiwan application serial no. 106132360, filed on Sep. 21, 2017. The entirety of the above-mentioned patent application is hereby incorporated by reference herein and made a part of specification.

BACKGROUND OF THE INVENTION

1. Field of the Invention

The invention relates to a detection method and a detection device, and particularly relates to a motion detection method and a motion detection device capable of dynamically correcting a detection range.

2. Description of Related Art

In the traditional motion detector, a passive infrared (PIR) sensor is adopted to passively absorb an infrared radiation signal. Through a special Fresnel lens on a surface of the sensor, an analog signal with positive and negative oscillations is generated. Regarding the analog signal, it is common to sample the signal and compare the sampled signal with a preset threshold to determine whether an object is approaching.

However, infrared energies transmitted by the object may differ at different locations and in different distances, and the signal received by the infrared sensor may be affected due to changes (e.g., change of temperature) in the surroundings. Therefore, using one single threshold to determine a signal lacks flexibility and thus makes it easier to have a detection blind spot when a field of view (FOV) of the sensor is adjusted.

SUMMARY OF THE INVENTION

The invention provides a motion detection method and a motion detection apparatus capable of dynamically adjusting parameters used to analyze signals in correspondence with a desired detection range, so as to facilitate dynamic detection accuracy.

An embodiment of the invention provides a motion detection device, including a motion detector, a storage device, and a controller coupled to the motion detector and the storage device. The controller is configured to set an expected detection range. The motion detector obtains a plurality of testing detection signals based on the expected detection range, and the testing detection signals that are obtained correspond to a plurality of expected detection results. The controller further generates a determination parameter set based on the testing detection signals and the expected detection results and records the determination parameter set in the storage device.

An embodiment of the invention provides a motion detection method adapted for a motion detection device. The motion detection method includes the following steps: setting an expected detection range; obtaining a plurality of testing detection signals based on the expected detection range, wherein the obtained testing detection signals correspond to a plurality of expected detection results; and generating a determination parameter set according to the testing detection signals and the corresponding expected detection results.

Based on the above, the motion detection device and the motion detection method according to the embodiments of the invention are able to find out the optimal determination parameter set corresponding to the expected detection range by using the testing detection signals. Hence, blind spots during motion detection may be reduced, and the detection accuracy may be facilitated.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
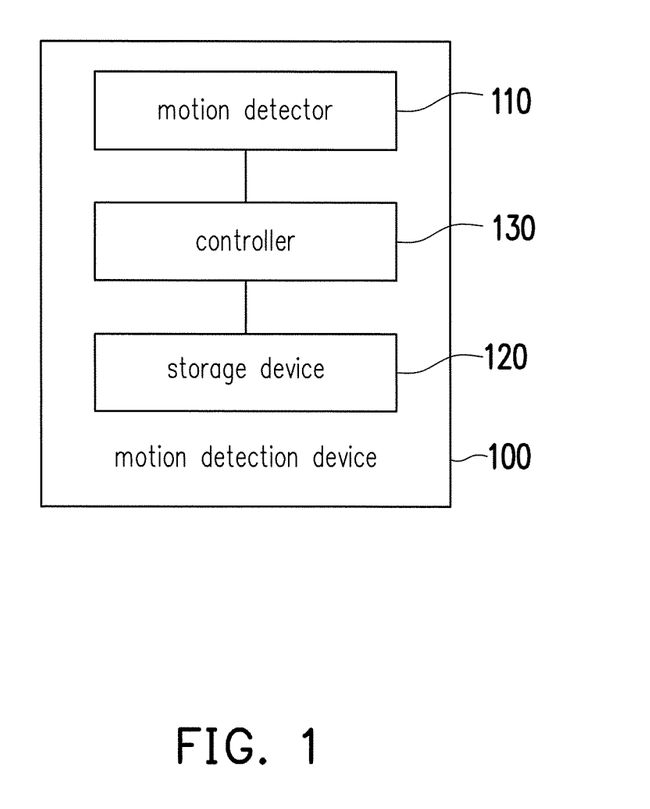
FIG. 1 is a schematic block view illustrating a motion detection device according to an embodiment of the invention.

FIG. 1 is a schematic block view illustrating a motion detection device according to an embodiment of the invention.

Referring to FIG. 1, a motion detection device 100 includes a motion detector 110, a storage device 120, and a controller 130. The controller 130 is coupled to the motion detector 110 and the storage device 120 and is configured to control an overall operation of the motion detection device 100.

The motion detector 110 is configured to obtain a detection signal. In an embodiment, the motion detector 110 is a passive infrared (PIR) sensor absorbing an infrared radiation signal and correspondingly generating an analog detection signal with positive and negative oscillations, but the invention is not limited thereto. For example, when a person enters a field of view (FOV) of the motion detector 110, since an amount of absorbed infrared radiation increases, the oscillations of the analog detection signal become more severe. In other words, the oscillations of amplitude of the detection signal may serve to reflect changes of the amount of infrared radiation absorbed by the motion detector 110. If a change is significant enough, it is indicated that that an object originally not present may be present in the field of view of the motion detector 110. Nevertheless, regardless of the type of motion detector used, environment factors or various other factors may still result in undesired noises in the obtained detection signal.

The storage device 120 is configured to store data, and may be any type of fixed or mobile random access memory (RAM), read-only memory (ROM), flash memory, other similar devices, or a combination thereof. However, the invention is not limited thereto. In an embodiment, a determination parameter set is recorded in the storage device 120 to convert the analog detection signal into a detection result.

The controller 130 may carry out the motion detection method according to the embodiment of the invention to generate the determination parameter set and record the determination parameter set in the storage device 120. Hence, the controller 130 may convert the detection signal obtained by the motion detector 110 into the detection result based on the determination parameter set recorded in the storage device 120. In an embodiment, the controller 130 is a central processing unit (CPU), other programmable general-purpose or specific-purpose microprocessors, a digital signal processor (DSP), a programmable controller, an application specific integrated circuit (ASIC), a programmable logic device (PLD), other similar devices, or a combination thereof, for example. It should be noted that the invention is not limited thereto.

Figure 2:
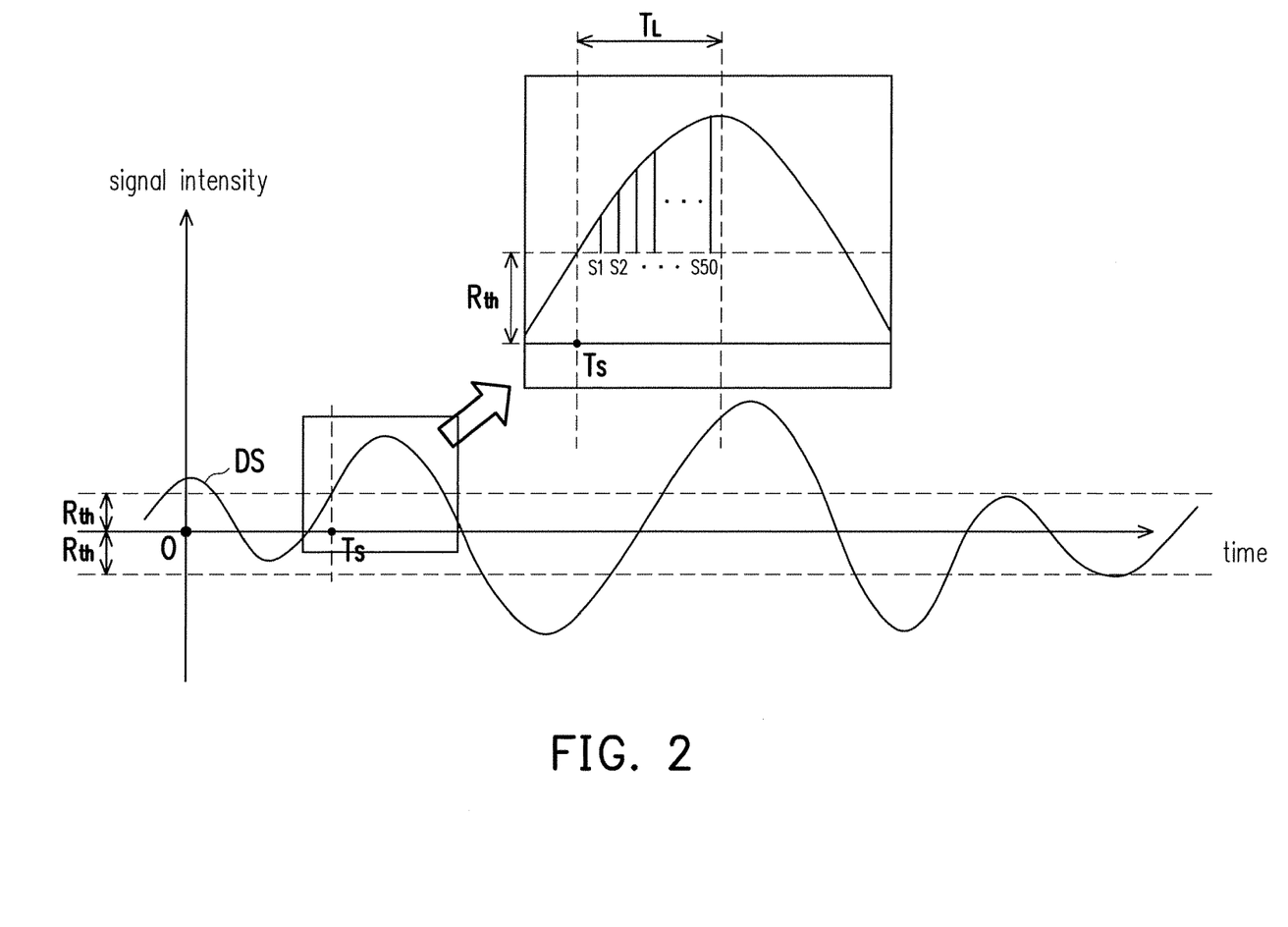
FIG. 2 is a schematic view illustrating generating a detection result based on a determination parameter set and a detection signal according to an embodiment of the invention.
Figure 3:
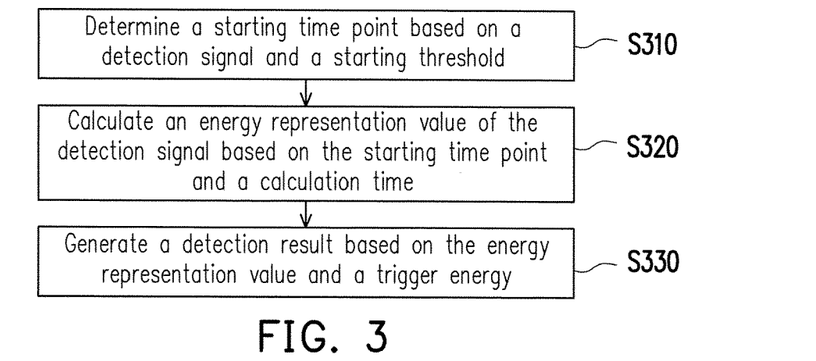
FIG. 3 is a flowchart view illustrating generating the detection result based on the determination parameter set and the detection signal according to an embodiment of the invention.

FIG. 2 is a schematic view illustrating generating a detection result based on a determination parameter set and a detection signal according to an embodiment of the invention, and FIG. 3 is a flowchart view illustrating generating the detection result based on the determination parameter set and the detection signal according to an embodiment of the invention.

Referring to FIGS. 2 and 3, in an embodiment, the determination parameter set includes a starting threshold $R_{th}$, a calculation time $T_L$, and a trigger energy. The starting threshold $R_{th}$ and the trigger energy determine detection sensitivity of the motion detection device 100, whereas the calculation time $T_L$ determines a response speed of the motion detection device 100.

At Step S310, the controller 130 determines a starting time point $T_S$ based on a detection signal DS and the starting threshold $R_{th}$. In an embodiment, when the motion detector 110 is in a normal environment without detecting an object, the obtained detection signal DS may show oscillations with respect to a reference value O. When the controller 130 detects that an oscillation amplitude of the detection signal DS exceeds the starting threshold $R_{th}$, the controller 130 may determine that the time point is the starting time point $T_s$. For example, the detection signal DS is a voltage value, the reference point O may be 0.9 V, and the starting threshold $R_{th}$ may be set at 0.8 V. Accordingly, when the voltage value of the detection signal DS is greater than 1.7 V or less than 0.1 V at a moment, the controller 130 may determine the moment to be the starting time point $T_s$.

At Step S320, the controller 130 may calculate an energy representation value of the detection signal DS based on the starting time point $T_s$ and the calculation time $T_L$. Specifically, from the starting time point $T_s$, the controller 130 may start calculating the energy representation value output by the detection signal DS within the calculation time $T_L$. Since the energy is positively related to a signal value (e.g., a voltage value or a current value) of the detection signal DS and positively related to time, in an embodiment, the controller 130 may calculate the energy representation value by obtaining a difference between the oscillation amplitude of the detection signal DS and the starting threshold $R_{th}$ (i.e., a part where the oscillation amplitude of the detection signal DS exceeds the starting threshold $R_{th}$). For example, when the calculation time $T_L$ is 0.5 seconds, the controller 130 may sample the detection signal DS at a specific frequency (e.g., 100 Hertz) from the starting time point $T_s$ to obtain 50 signal samples S1 to S50. Then, the energy representation value may be calculated based on Equation (1) in the following, for example.

$$E = \frac{1}{fs}\sum_{n=1}^{50}(|Sn-O|-R_{th})^2 \qquad (1)$$

In Equation (1), E represents the energy representation value, fs represents the specific frequency for sampling, Sn represents the signal value sample, O represents the reference value, and $R_{th}$ represents the starting threshold.

In other embodiments, the controller 130 may directly use the oscillation amplitude of the detection signal DS, such as $$E = \frac{1}{fs}\sum_{n=1}^{50}(Sn-O)^2,$$

to obtain the energy representation value. Alternatively, the controller 130 may directly use the output energy, such as $$E = \frac{1}{fs}\sum_{n=1}^{50}Sn^2,$$

of the detection signal within the calculation time $T_L$ to serve as the energy representation value. It should be noted that the invention does not intend to impose a limitation on this regard.

At Step S330, in an embodiment, the controller 130 may generate the detection result based on the energy representation value and the trigger energy. In an embodiment, the detection result may include states such as "detected" and "not detected". Thus, the trigger energy is set to be a single value. When the energy representation value reaches (not less than) the single value, the detection result is "detected", indicating that an object may be detected within the field of view of the motion detector 110. When the energy representation value does not reach (less than) the single value, the detection result is "not detected", indicating that the motion detector 110 does not detect an object within the field of view of the motion detector 110. In an embodiment, the controller 130 is further coupled to a prompting device (not shown) configured to send a prompt signal or alarm when the detection result is "detected".

However, the invention is not limited to the detection result of the embodiment. In other embodiments, the detection result may include two or more states, for example. In such case, the trigger energy may be set to include a plurality of values, for example, to form a plurality of intervals, and different intervals represent different states. Accordingly, the controller 130 is able to determine the state of the detection result based on the interval where the energy representation value belongs.

Besides, in some embodiments, the determination parameter set may include only one, two, or three or more different parameters configured to convert the detection signal obtained by the motion detector 110 into the detection result. It should be noted that the invention does not impose a limitation on this regard.

As described above, the controller 130 of the motion detection device 100 is able to generate the detection result based on the determination parameter set and the detection signal obtained by the motion detector 110. In the following, the motion detection method according to the embodiment of the invention will be described. The motion detection method is able to generate the suitable determination parameter set, so as to be adaptable to various setting environment, setting angles, and needs of use.

Figure 4:
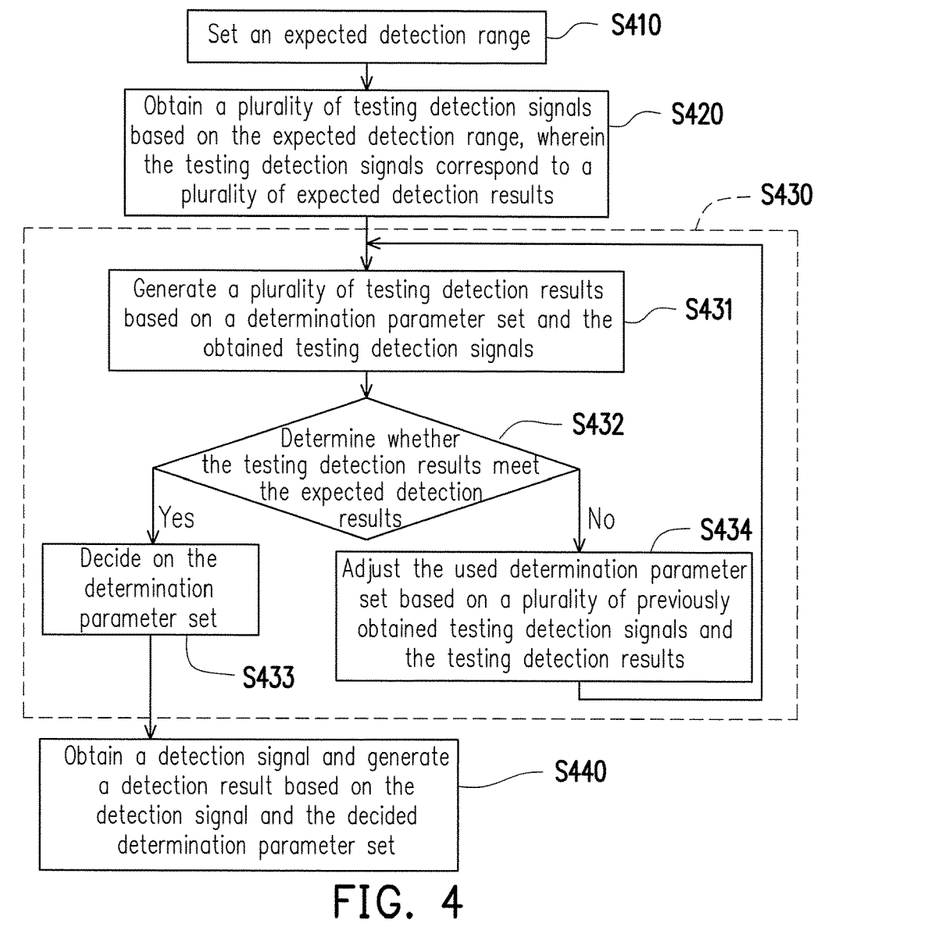
FIG. 4 is a flowchart illustrating a motion detection method according to an embodiment of the invention.

FIG. 4 is a flowchart illustrating a motion detection method according to an embodiment of the invention. In an embodiment of the invention, the motion detection method is suitable for the motion detection device 100 in the embodiment of FIG. 1. Therefore, details of the motion detection method according to the embodiment of the invention are described in the following with reference to the respective components of the motion detection device 100 in the embodiment of FIG. 1.

Referring to FIGS. 1 and 4, at Step S410, the controller 130 sets an expected detection range. In an embodiment, the motion detection device 100 further includes a receiver (not shown) to receive an external selection signal for selecting the expected detection range. For example, the receiver includes a plurality of physical or virtual buttons disposed on the motion detection device 100, and the expected detection range is selected by pressing one of the buttons. In another example, the receiver is a wireless communication module, for example, and is configured to receive a signal from a user device, a remote controller, or an Ethernet network to indicate the motion detection device 100 to set the expected detection range. The invention does not intend to limit how the motion detection device 100 obtains the expected detection range. People having ordinary skills in the art may make a choice based on needs.

Figure 5:
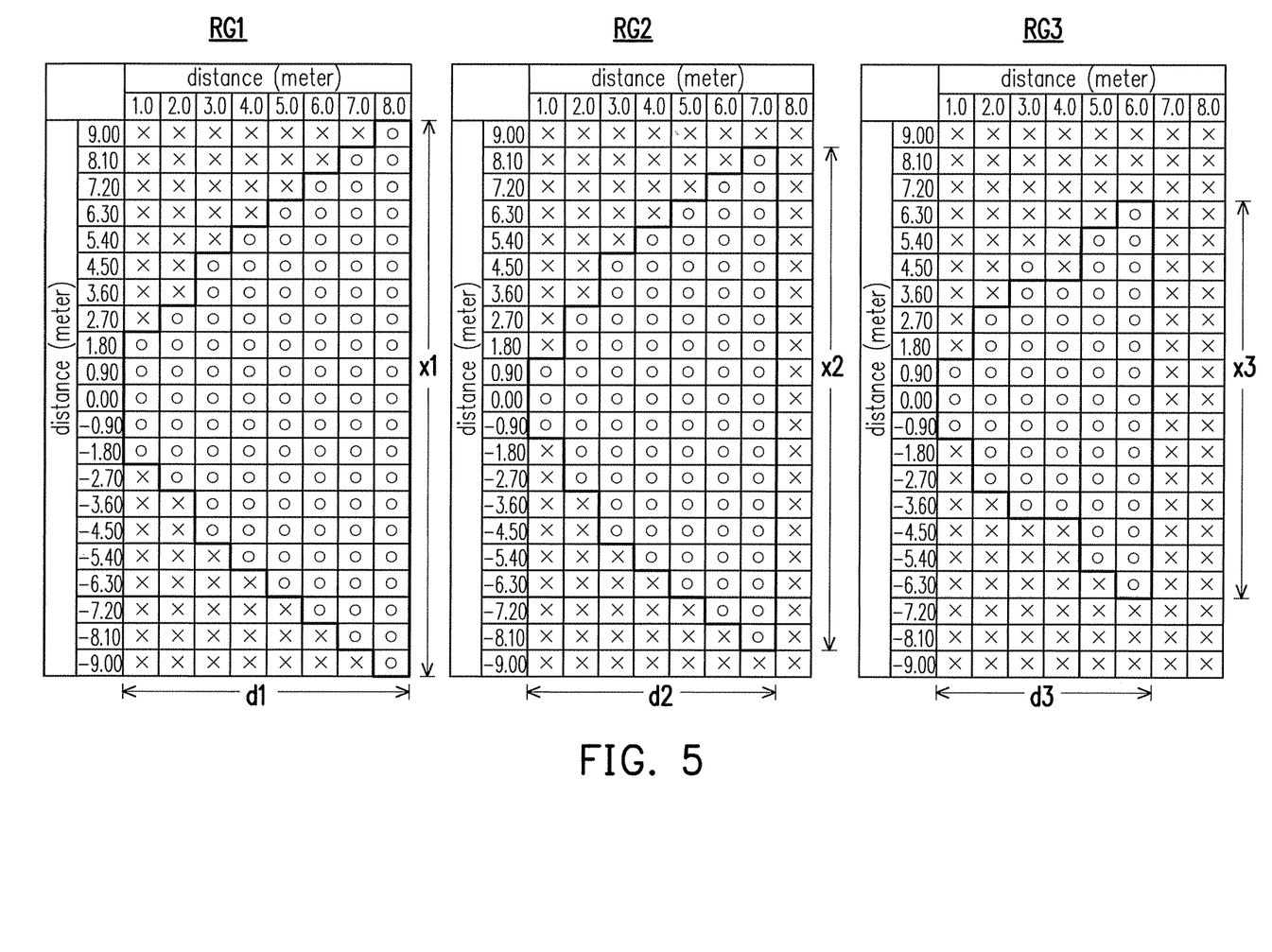
FIG. 5 is a schematic diagram illustrating setting an expected detection range according to an embodiment of the invention.

FIG. 5 is a schematic diagram illustrating setting an expected detection range according to an embodiment of the invention.

Referring to FIG. 5, in an embodiment, the storage device 120 records three detection ranges RG1, RG2, and RG3 detectable by the motion detection device 100. In which, the motion detection range RG1 covers the largest region, followed by the detection range RG2, and the region covered by the detection range RG3 is the smallest. Specifically, in FIG. 5, a symbol "o" in the detection range serves to indicate that a position is detectable, and a symbol "x" in the detection range serves to indicate that a position is not detectable. Besides, the storage device 120 of the embodiment further records a preset parameter set corresponding to each of the detection ranges. For example, the detection ranges and the corresponding preset parameter sets are default when the motion detection device 100 leaves the factory. However, the invention is not limited thereto.

The motion detection device 100 receives the external selection signal selecting one of the detection ranges RG1, RG2, and RG3 to be the expected detection range. Then, the controller 130 may set the selected detection range RG1, RG2, or RG3 to be the expected detection range and adopt the expected detection range as a standard to set the determination parameter set. More specifically, the controller 130 may adopt the expected detection range as a target to set the determination parameter set, such that the objects moving in the expected detection range can be reflected in the detection result as much as possible.

In other embodiments, the external selection signal selects the expected detection range in a different manner. The invention does not intend to impose a limitation on this regard. Taking the embodiment of FIG. 5 as an example, the external selection signal may include a width parameter $x1$ and a distance parameter $d1$, for example, to respectively represent a width and a depth covered by the detection range RG1, so as to select the detection range RG1 accordingly. Similarly, a width parameter $x2$ and a distance parameter $d2$ respectively smaller than the width parameter $x1$ and the distance parameter $d1$ may respectively represent a width and a depth covered by the detection range RG2, and a width parameter $x3$ and a distance parameter $d3$ respectively smaller than the width parameter $x2$ and the distance parameter $d2$ may respectively represent a width and a depth covered by the detection range RG3. Particularly, the expected detection range selected by directly inputting parameters through the external selection signal may adapt to the motion detector 110 mounted at different positions and angles.

Returning to FIG. 4, at Step S420, the controller 130 may obtain a plurality of testing detection signals through the motion detector 110 according to the expected detection range that is set. In an embodiment, the respective testing detection signals are detection signals having expected detection results in correspondence with the selected expected detection range. For example, the testing detection signals are generated when the user sequentially moves to a plurality of designated positions in the expected detection range, and the user's each movement to one of the designated positions corresponds to one testing detection signal. Since the designated positions are all within the expected detection range, every testing detection signal corresponds to one single expected detection result (e.g., "detected"). In an embodiment, the controller 130 further records the obtained testing detection signals in the storage device 120 for further disposal.

At Step S430, the controller 130 may generate the determination parameter set based on the obtained testing detection signals and the corresponding expected detection results. In an embodiment, the controller 130 includes an adaptive parameter generator, for example, and the determination parameter set is generated by having the adaptive parameter generator execute a smart algorithm (such as, but not limited to, MMSE, LMS, Neural Network, and PSO algorithms), so that the generated determination parameter set may allow the testing detection results converted from the testing detection signals to meet the corresponding expected detection results.

Specifically, Step S430 includes Steps S431 to S434. At Step S431, the controller 130 may generate the testing detection results (e.g., first testing detection results) based on the determination parameter set (e.g., a first determination parameter set) and the obtained testing detection signals. The first determination parameter set is a preset parameter set corresponding to the selected expected detection range recorded in the storage device 120. The first determination parameter set may also be a randomly generated parameter set. The invention does not intend to impose a limitation on this regard.

At Step S432, the controller 130 may determine whether the generated testing detection results meet the expected detection results. For example, the controller 130 may determine whether the respective testing detection results that are generated are identical to the corresponding expected detection results. If the controller 130 determines that the testing detection results meet the corresponding expected detection results, the controller 130 may decide on the determination parameter set and record the determination parameter set in the storage device at Step S433, so as to be used by the motion detection device 100 in actual operation.

Alternatively, if the controller 130 determines that the testing detection results do not meet the corresponding expected detection results, at Step S434, the controller 130 may adjust the used determination parameter set by using the adaptive parameter generator based on the obtained testing detection signals and the testing detection results. In addition, Step S431 is performed again to generate a plurality of testing detection results (e.g., second testing detection results) based on an adjusted determination parameter set (e.g., a second determination parameter set) and the previously obtained testing detection signals. The same steps are performed until the testing detection results meet the expected detection results and the controller 130 records the generated determination parameter set in the storage device 120.

At Step S440, after obtaining the detection signals through the motion detector 110, the controller 130 may generate the detection results based on the detection signals and the determination parameter set recorded in the storage device 120. Specifically, after the determination parameter set is recorded in the storage device 120, the motion detection device 100 is able to convert the detection signals into the detection results based on the determination parameter set recorded in the storage device 120 in actual operation.

In an embodiment, the motion detection device 100 further includes an environment sensor coupled to the controller 130 and configured to receive an environment sensing signal. For example, the environment sensor configured to obtain the environment sensing signal includes, for example, at least one of a temperature sensor, a luminance sensor, and a moisture sensor. Since the detection signals obtained by the motion detector 110 depends on the environment, the controller 130 may adjust the determination parameter set recorded in the storage device 120 periodically (e.g., every day, every week, or every month, but the invention is not limited thereto) based on the environment sensing signal, for example.

Under some circumstances, the controller 130 of the motion detection device 100 has a computing capability to convert the detection signals into the detection results based on the determination parameter set, but does not have a capability sufficient to execute the adaptive algorithm or the smart algorithm. Therefore, the controller 130 is unable to obtain the optimal determination parameter set based on the testing detection signals and the expected detection results on its own.

Figure 6:
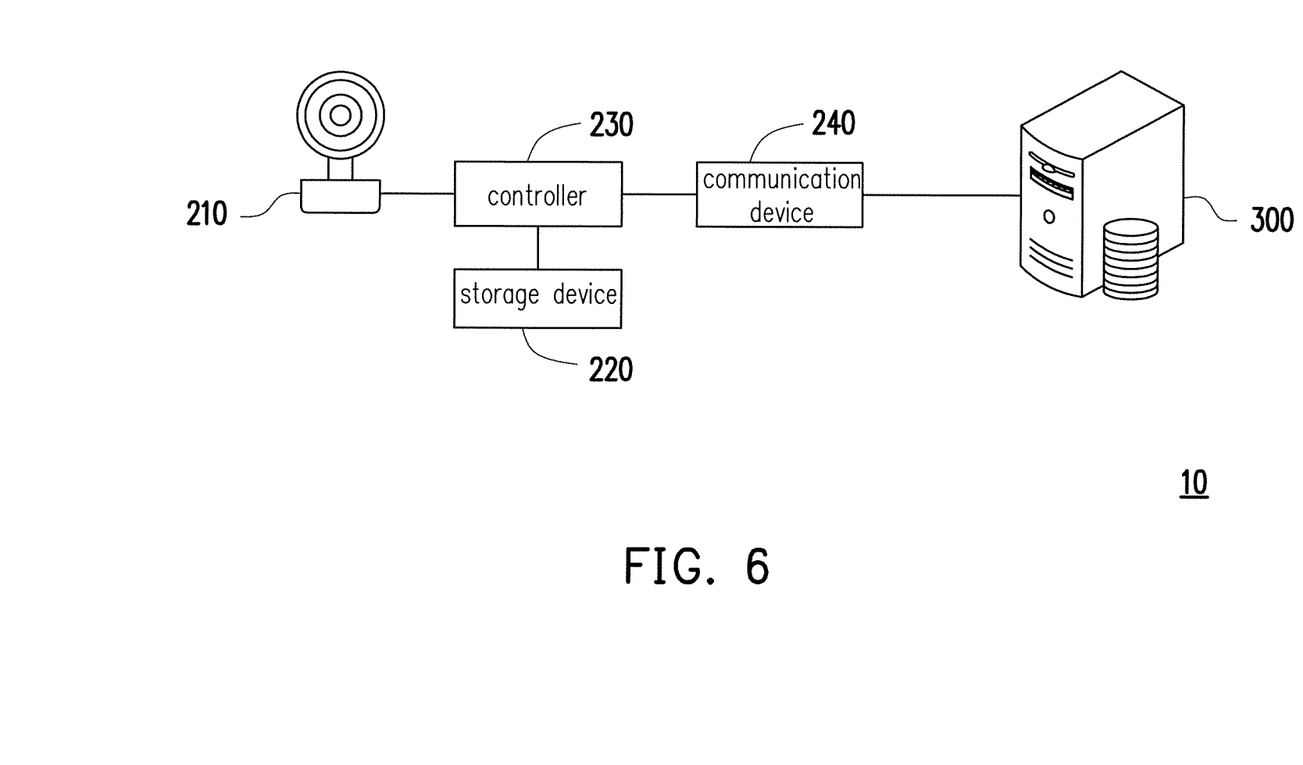
FIG. 6 is a schematic view illustrating a motion detection system according to an embodiment of the invention.

FIG. 6 is a schematic view illustrating a motion detection system according to an embodiment of the invention. Referring to FIG. 6, a motion detection device according to the embodiment of the invention may also be implemented in a form of a motion detection system 10, for example. The motion detection system 10 includes a motion detector 210, a storage device 220, a controller 230, a communication device 240, and a server 300. In addition, the controller 230 is coupled to the motion detector 210, the storage device 220, and the communication device 240. The server 300 is a cloud server, for example, and is connected with the communication device 240 via a network. The motion detector 210 and the storage device 220 are respectively similar to the motion detector 110 and the storage device 120 in the motion detection device 100. Thus, descriptions about like or similar components are omitted in the following.

It should be noted that, since the controller 230 is further coupled to the communication device 240, the controller 230 is able to be connected to the server 300 via the network. Therefore, the controller 230 does not require a capability sufficient to carry out the adaptive algorithm while the motion detection system 10 is still able to carry out the motion detection method according to the embodiment of the invention, as the adaptive algorithm may be carried out by a controller (not shown) or a processor (not shown) in the server 300.

In the following, the motion detection method in the embodiment of FIG. 4 is described with reference to the respective components in the motion detection system 10 in the embodiment of FIG. 6. Nevertheless, details of the steps described above will not be repeated in the following.

Referring to FIGS. 4 and 6, at Step S410, the server 300 sets an expected detection range. In an embodiment, the server 300 may receive the expected detection range from a user device, for example. At Step S420, the server 300 may receive the testing detection signals obtained by the motion detector 210 from the controller 230. Specifically, the motion detector 210 may obtain the testing detection signals and transmit the testing detection signals to the server 300 through the controller 230 and the communication device 240. Similarly, the respective testing detection signals are detection signals having expected detection results in correspondence with the expected detection range received by the server 300.

Then, at Step S430, the controller 300 may generate the determination parameter set based on the obtained testing detection signals and the corresponding expected detection results. In an embodiment, the server 300 includes an adaptive parameter generator, for example, and the determination parameter set is generated by having the adaptive parameter generator execute a smart algorithm (such as, but not limited to, MMSE, LMS, Neural Network, and PSO algorithms). Accordingly, the generated determination parameter set may allow testing detection results converted from the testing detection signals to meet the corresponding expected detection results.

Specifically, Step S430 includes Steps S431 to S434. At Step S431, the server 300 may generate the testing detection results (e.g., first testing detection results) based on the determination parameter set (e.g., a first determination parameter set) and the testing detection signals that are obtained At Step S432, the server 300 may determine whether the generated testing detection results meet the expected detection results. For example, the server 300 may determine whether the respective testing detection results that are generated are identical to the corresponding expected detection results. If the server 300 determines that the testing detection results meet the corresponding expected detection results, the server 300 may decide on the determination parameter set and transmit the determination parameter set back to the controller 230 at Step S433. In an embodiment, the controller 230 may record the determination parameter set in the storage device 220 coupled to the controller 230.

Alternatively, if the server 300 determines that the testing detection results do not meet the corresponding expected detection results, at Step S434, the server 300 may adjust the determination parameter set that is used by using the adaptive parameter generator based on the obtained testing detection signals and the testing detection results. In addition, Step S431 is performed again to generate a plurality of testing detection results (e.g., second testing detection results) based on an adjusted determination parameter set (e.g., a second determination parameter set) and the previously obtained testing detection signals. The same steps are performed until the testing detection results meet the expected detection results and the server 300 transmit the generated determination parameter set to the controller 230.

Lastly, at Step S440, after the motion detector 210 obtains the detection signals, the controller 230 coupled to the motion detector 210 may generate the detection results based on the detection signals and the determination parameter set recorded in the storage device 220. Specifically, after the determination parameter set is recorded in the storage device 220, the controller 230 is able to convert the detection signal obtained by the motion detector 210 into the detection results based on the determination parameter set in actual operation.

Hence, even if the controller 230 built in or externally connected to the motion detector 210 does not have a capability sufficient to execute the adaptive algorithm or the smart algorithm, the motion detection method according to the embodiment may still be carried out by resorting to the computing capability of the controller or the processor of the cloud server 300 through the network by using the communication device 240.

Similarly, in an embodiment, the environment sensor (not shown) may be disposed to be adjacent to the motion detector 210 and coupled to the controller 230 coupled to the motion detector 200. Accordingly, the controller 230 may adjust the determination parameter set recorded in the storage device 220 periodically (e.g., every day, every week, or every month, but the invention is not limited thereto) based on the environment sensing signal obtained by the environment sensor.

In view of the foregoing, the motion detection device and the motion detection method according to the embodiments of the invention are able to find out the optimal determination parameter set corresponding to the expected detection range by using the testing detection signals. Hence, blind spots during motion detection may be reduced, and the detection accuracy may be facilitated. Besides, according to the embodiments of the invention, the environment information is obtained through the environment sensor, and the determination parameter set is modified based on the environment information. Hence, the motion detection device is adapted to different environments and is able to consistently provide accurate detection results.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motion detection device, comprising:
   a motion detector, configured to obtain a plurality of testing detection signals based on an expected detection range, wherein the testing detection signals correspond to a plurality of expected detection results;
   a storage device; and
   a controller comprising an adaptive parameter generator, coupled to the motion detector and the storage device, and configured to:
   set the expected detection range;
   generate a determination parameter set by executing a smart algorithm using the adaptive parameter generator based on the testing detection signals and the expected detection results; and
   record the determination parameter set in the storage device,
   wherein the determination parameter set comprises a starting threshold, a calculation time and a trigger energy,
   wherein the motion detector is further configured to receive a detection signal, and the controller is further configured to determine a starting time point based on the detection signal and the starting threshold comprised in the determination parameter set recorded in the storage device, calculate an energy representation value of the detection signal based on the starting time point and the calculation time comprised in the determination parameter set recorded in the storage device, and generate a detection result based on the energy representation value and the trigger energy comprised in the determination parameter set recorded in the storage device.

2. The motion detection device as claimed in claim 1, further comprising:
   a receiver, coupled to the controller and configured to receive an external selection signal configured to select the expected detection range.

3. The motion detection device as claimed in claim 1, wherein the controller is configured to generate a plurality of first testing detection results based on a first determination parameter set and the testing detection signals and determine whether the first testing detection results meet the expected detection results,
   wherein the controller is further configured to record the first determination parameter set in the storage device if the first testing detection results meet the expected detection results, and
   wherein if the first testing detection results do not meet the expected detection results, the controller is further configured to adjust the first determination parameter set to form a second determination parameter set based on the testing detection signals and the first testing detection results, generate a plurality of second testing detection results based on the second determination parameter set and the testing detection signals, and determine whether the second testing detection results meet the expected detection results.

4. The motion detection device as claimed in claim 1, further comprising:
   an environment sensor, coupled to the controller and configured to obtain an environment sensing signal, wherein the controller is further configured to adjust the determination parameter set recorded in the storage device based on the environment sensing signal.

5. A motion detection method, applicable to a motion detection device comprising a controller, wherein the controller comprises an adaptive parameter generator, the method comprising:
   setting an expected detection range;
   obtaining a plurality of testing detection signals based on the expected detection range, wherein the testing detection signals correspond to a plurality of expected detection results;
   generating a determination parameter set by executing a smart algorithm using the adaptive parameter generator based on the testing detection signals and the expected detection results, wherein the determination parameter set comprises a starting threshold, a calculation time and a trigger energy;

obtaining a detection signal;

determining a starting time point based on the detection signal and the starting threshold of the generated determination parameter set;

calculating an energy representation value of the detection signal based on the starting time point and the calculation time of the generated determination parameter set; and generating a detection result based on the energy representation value and the trigger energy of the generated determination parameter set.

6. The motion detection method as claimed in claim 5, wherein setting the expected detection range comprises:

receiving an external selection signal configured to select the expected detection range.

7. The motion detection method as claimed in claim 5, wherein generating the determination parameter set based on the testing detection signals and the expected detection results comprises:

generating a plurality of first testing detection results based on a first determination parameter set and the testing detection signals;

determining whether the first testing detection results meet the expected detection results;

adopting the first determination parameter set as the determination parameter set if the first testing detection results meet the expected detection results, and adjusting the first determination parameter set to form a second determination parameter set based on the testing detection signals and the first testing detection results, generating a plurality of second testing detection results based on the second determination parameter set and the testing detection signals, and determining whether the second testing detection results meet the expected detection results if the first testing detection results do not meet the expected detection results.

8. The motion detection method as claimed in claim 5, further comprising:

obtaining an environment sensing signal;

adjusting the determination parameter set based on the environment sensing signal.

* * * * *